US011062309B2

(12) United States Patent
Pacher et al.

(10) Patent No.: US 11,062,309 B2
(45) Date of Patent: *Jul. 13, 2021

(54) SYSTEMS AND METHODS FOR PROCESSING OFF-NETWORK TRANSACTION MESSAGES

(71) Applicant: MASTERCARD INTERNATIONAL INCORPORATED, Purchase, NY (US)

(72) Inventors: Frederick Michael Pacher, Williston Park, NY (US); Mikhail Blinov, Dun Laoghaire (IE); Edwin V. Diekemper, Marine, IL (US); Peter J. Groarke, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 252 days.

This patent is subject to a terminal disclaimer.

(21) Appl. No.: 16/048,888

(22) Filed: Jul. 30, 2018

(65) Prior Publication Data

US 2018/0336556 A1 Nov. 22, 2018

Related U.S. Application Data

(63) Continuation of application No. 13/742,172, filed on Jan. 15, 2013, now Pat. No. 10,043,181.

(51) Int. Cl.
*G06Q 20/40* (2012.01)
*G06Q 20/22* (2012.01)
*G06Q 20/42* (2012.01)

(52) U.S. Cl.
CPC ............ *G06Q 20/40* (2013.01); *G06Q 20/22* (2013.01); *G06Q 20/401* (2013.01);
(Continued)

(58) Field of Classification Search
CPC ..................................................... G06Q 20/40
(Continued)

(56) References Cited

U.S. PATENT DOCUMENTS 5,826,241 A 10/1998 Stein et al.
5,933,816 A 8/1999 Zeanah et al.
(Continued)

FOREIGN PATENT DOCUMENTS

JP 2002298055 A 10/2002
JP 2005275459 A 10/2005
(Continued)

OTHER PUBLICATIONS

Mhamane, S., Lobo L.M.R.J., Fraud Detection in Online Banking Using HMM 2012, 2012 International Conference on information and Network Technology, IPCSIT vol. 37 2012 (Year: 2012) (Year: 2012).*

(Continued)

*Primary Examiner* — Elizabeth H Rosen
*Assistant Examiner* — Kevin T Poe
(74) *Attorney, Agent, or Firm* — Armstrong Teasdale LLP

(57) ABSTRACT

A computer-implemented method for applying enrichment services hosted on a second interchange network to a payment transaction initiated over a first interchange network is provided. A transfer process module hosted on the first interchange network receives a first service request from a requestor, formatted in accordance with a first set of proprietary communications standards associated with the first payment network, and transforms the first service request to a second service request formatted in accordance with a second set of proprietary communications standards associated with the second payment network. An enrichment services computer system hosted on the second interchange network receives the second service request and generates a (Continued)

first service response formatted in accordance with the first set of proprietary communications standards. The first service response is transformed at the transfer process module to create a second service response formatted in accordance with the second set of proprietary communications standards.

17 Claims, 7 Drawing Sheets

(52) U.S. Cl.
CPC ......... *G06Q 20/405* (2013.01); *G06Q 20/409* (2013.01); *G06Q 20/4016* (2013.01); *G06Q 20/4093* (2013.01); *G06Q 20/4097* (2013.01); *G06Q 20/40975* (2013.01); *G06Q 20/425* (2013.01)

(58) Field of Classification Search
USPC .......................................................... 705/44
See application file for complete search history.

(56) References Cited

U.S. PATENT DOCUMENTS

| | | | |
|---|---|---|---|
| 5,987,123 | A | 11/1999 | Scott et al. |
| 6,266,651 | B1 | 7/2001 | Woolston |
| 7,088,995 | B2 | 8/2006 | Rao |
| 7,252,223 | B2 | 8/2007 | Schofield |
| 7,296,065 | B2 | 11/2007 | Anderson et al. |
| 7,523,055 | B2 | 4/2009 | Anderson et al. |
| 8,214,233 | B2 | 7/2012 | Coyne |
| 2001/0011256 | A1 | 8/2001 | Hannula et al. |
| 2004/0010462 | A1 | 1/2004 | Moon et al. |
| 2005/0080703 | A1 | 4/2005 | Chiesa et al. |
| 2005/0121512 | A1* | 6/2005 | Wankmueller ....... G06Q 20/357 235/380 |
| 2006/0020542 | A1 | 1/2006 | Litle et al. |
| 2006/0271496 | A1 | 11/2006 | Balasubramanian et al. |
| 2007/0106619 | A1 | 5/2007 | Holdsworth |
| 2008/0040237 | A1* | 2/2008 | Crussol ................. G06Q 20/12 705/26.42 |
| 2009/0150266 | A1 | 6/2009 | Dickelman |
| 2012/0035946 | A1* | 2/2012 | Coyne ................... G06Q 40/08 705/2 |
| 2012/0143761 | A1* | 6/2012 | Doran ................... G06Q 20/08 705/44 |
| 2012/0197760 | A1 | 8/2012 | Balasubramanian et al. |
| 2013/0304648 | A1 | 11/2013 | O'Connell et al. |
| 2014/0122198 | A1* | 5/2014 | Cheung .............. G06Q 30/0207 705/14.13 |

FOREIGN PATENT DOCUMENTS

| | | |
|---|---|---|
| JP | 2007213305 A | 8/2007 |
| KR | 2011070614 A | 6/2011 |
| WO | 2011049872 A2 | 4/2011 |
| WO | 2011133899 A2 | 10/2011 |
| WO | 2011153281 A2 | 12/2011 |

OTHER PUBLICATIONS

Chaudhary, K, Yadav, J., Mallick, B. , (A review of Fraud Detection Techniques: Credit Card May 2012), International Journal of Computer Applications (0975-8887), vol. 45 -No. 1 (Year: 2012) (Year: 2012).*
Japanese Office Action, and English-Language translation, dated Sep. 5, 2017 for co-pending JP patent application No. JP2015-552628.
Extended European Search Report for European Application No. 13871910.9, dated May 19, 2016.
Mhamane, S., Lobo L.M.R.J., Fraud Detection in Online Banking Using HMM 2012, 2012 International Conference on Information and Network Technology, IPCSIT vol. 37 2012 (Year: 2012).
Chaudhary, K, Yadav, J., Mallick, B., (A review of Faud Detection Techniques: Credit Card May 2012), International Journal of Computer Applications (0957-8887), vol. 45-No. 1 (Year 2012).
PCT International Search Report and Written Opinion dated Jan. 28, 2014 for related matter PCT/US2013/064913.

* cited by examiner

SYSTEMS AND METHODS FOR PROCESSING OFF-NETWORK TRANSACTION MESSAGES

CROSS REFERENCE TO RELATED APPLICATIONS

This application is a continuation application of U.S. patent application Ser. No. 13/742,172 filed Jan. 15, 2013, entitled "SYSTEMS AND METHODS FOR PROCESSING OFF-NETWORK TRANSACTION MESSAGES", the disclosure of which is hereby incorporated herein by reference in its entirety.

BACKGROUND OF THE DISCLOSURE

The field of the invention relates generally to systems and methods for processing payment transactions and, more particularly, to systems and methods for applying off-network payment services to a home payment network payment transaction, wherein the home payment network payment transaction originates on a first payment network and the payment services are provided by a computing device associated with a second payment network.

The payment card industry allows for issuer banks and cardholders to use payment services, sometimes known as transaction enrichment services, in conjunction with transactions performed over a payment network. In some payment systems, these payment services allow a cardholder, using an interface, to register for such services.

These payment services may include, for example, predefined spending limits for a particular payment card. However, under these known systems, these payment services are only accessible for transactions performed over the "home" payment network. In other words, the payment services can only be applied to payment transactions that originate on the payment network offering the payment services.

As more and more payment transactions are being performed on different payment networks, it is desirable to offer payment services for transactions originating on payment networks other than the payment network where the transaction originated.

BRIEF DESCRIPTION OF THE DISCLOSURE

In one aspect, a computer-implemented method for applying enrichment services hosted on a second interchange network to a payment transaction initiated over a first interchange network is provided. The first interchange network utilizes a first set of proprietary communications standards for the exchange of financial transaction data and the settlement of funds between financial institutions that are members of the first interchange network, and the second interchange network utilizes a second set of proprietary communications standards for the exchange of financial transaction data and the settlement of funds between financial institutions that are members of the second interchange network The method includes receiving, at a transfer process module hosted on the first interchange network, a first service request from a requestor. The first service request includes request data associated with (i) a corresponding payment transaction over the first interchange network and (ii) a registration of a payment card used in the corresponding payment transaction for the enrichment services. The first service request has a first set of file characteristics formatted in accordance with the first set of proprietary communications standards and not in accordance with the second set of proprietary communications standards. The method also includes transforming, by the transfer process module, the first service request to create a second service request that includes the request data. The second service request has a second set of file characteristics formatted in accordance with the second set of proprietary communications standards and not in accordance with the first set of proprietary communications standards. The method further includes receiving, at an enrichment services computer system hosted on the second interchange network, the second service request, and generating, by the enrichment services computer system, a first service response that includes response data based on applying at least one of a virtual card mapping service, a transaction rules and limits service, and an alert notifications service to the payment transaction corresponding to the request data. The first service response has a third set of file characteristics formatted in accordance with the second set of proprietary communications standards and not in accordance with the first set of proprietary communications standards. Additionally, the method includes receiving, at the transfer process module, the first service response, and transforming, by the transfer process module, the first service response to create a second service response that includes the response data. The second service response has a fourth set of file characteristics formatted in accordance with the first set of proprietary communications standards and not in accordance with the second set of proprietary communications standards. The method also includes transmitting, by the transfer process module, the second services response to at least one of a cardholder of the payment card and the requestor.

In another aspect, a system for applying enrichment services hosted on a second interchange network to a payment transaction initiated over a first interchange network is provided. The first interchange network utilizes a first set of proprietary communications standards for the exchange of financial transaction data and the settlement of funds between financial institutions that are members of the first interchange network, and the second interchange network utilizes a second set of proprietary communications standards for the exchange of financial transaction data and the settlement of funds between financial institutions that are members of the second interchange network. The system includes a first computing device hosted on the first interchange network, the first computing device including at least one first processor and a first computer-readable storage device having encoded thereon first computer-executable instructions. The system also includes a second computing device hosted on the second interchange network, the second computing device including at least one second processor and a second computer-readable storage device having encoded thereon second computer-executable instructions. The first computer-executable instructions are executable to cause the at least one first processor to receive a first service request from a requestor. The first service request includes request data associated with (i) a corresponding payment transaction over the first interchange network and (ii) a registration of a payment card used in the corresponding payment transaction for the enrichment services. The first service request has a first set of file characteristics formatted in accordance with the first set of proprietary communications standards and not in accordance with the second set of proprietary communications standards. The first computer-executable instructions are executable to further cause the at least one first processor to transform the first service request to create a second service request that includes the request data. The second service request has a second set of file characteristics formatted in accordance with the second set of proprietary communications standards and not in accordance with the first set of proprietary communications standards. The second computer-executable instructions are executable to cause the at least one second processor to receive the second service request. The second computer-executable instructions are executable to further cause the at least one second processor to generate a first service response that includes response data based on applying at least one of a virtual card mapping service, a transaction rules and limits service, and an alert notifications service to the payment transaction corresponding to the request data. The first service response has a third set of file characteristics formatted in accordance with the second set of proprietary communications standards and not in accordance with the first set of proprietary communications standards. The first computer-executable instructions are executable to further cause the at least one first processor to receive the first service response. The first computer-executable instructions are executable to further cause the at least one first processor to transform the first service response to create a second service response that includes the response data. The second service response has a fourth set of file characteristics formatted in accordance with the first set of proprietary communications standards and not in accordance with the second set of proprietary communications standards. The first computer-executable instructions are executable to further cause the at least one first processor to transmit the second services response to at least one of a cardholder of the payment card and the requestor.

In another aspect, computer-readable storage media for applying enrichment services hosted on a second interchange network to a payment transaction initiated over a first interchange network is provided. The first interchange network utilizes a first set of proprietary communications standards for the exchange of financial transaction data and the settlement of funds between financial institutions that are members of the first interchange network, and the second interchange network utilizes a second set of proprietary communications standards for the exchange of financial transaction data and the settlement of funds between financial institutions that are members of the second interchange network. The computer readable storage media have embodied thereon (i) a first set of computer-executable instructions for execution by at least one first processor associated with a first computing device hosted on the first interchange network and coupled to a first computer-readable storage device, and (ii) a second set of computer-executable instructions for execution by at least one second processor associated with a second computing device hosted on the second interchange network and coupled to a second computer-readable storage device. The first set of computer-executable instructions, when executed by the at least one first processor, cause the at least one first processor to receive a first service request from a requestor. The first service request includes request data associated with (i) a corresponding payment transaction over the first interchange network and (ii) a registration of a payment card used in the corresponding payment transaction for the enrichment services. The first service request has a first set of file characteristics formatted in accordance with the first set of proprietary communications standards and not in accordance with the second set of proprietary communications standards. The first set of computer-executable instructions, when executed by the at least one first processor, further cause the at least one first processor to transform the first service request to create a second service request that includes the request data. The second service request has a second set of file characteristics formatted in accordance with the second set of proprietary communications standards and not in accordance with the first set of proprietary communications standards. The second set of computer-executable instructions, when executed by the at least one second processor, cause the at least one second processor to receive the second service request. The second set of computer-executable instructions, when executed by the at least one second processor, further cause the at least one second processor to generate a first service response that includes response data based on applying at least one of a virtual card mapping service, a transaction rules and limits service, and an alert notifications service to the payment transaction corresponding to the request data. The first service response has a third set of file characteristics formatted in accordance with the second set of proprietary communications standards and not in accordance with the first set of proprietary communications standards. The first set of computer-executable instructions, when executed by the at least one first processor, further cause the at least one first processor to receive the first service response. The first set of computer-executable instructions, when executed by the at least one first processor, further cause the at least one first processor to transform the first service response to create a second service response that includes the response data. The second service response has a fourth set of file characteristics formatted in accordance with the first set of proprietary communications standards and not in accordance with the second set of proprietary communications standards. The first set of computer-executable instructions, when executed by the at least one first processor, further cause the at least one first processor to transmit the second services response to at least one of a cardholder of the payment card and the requestor.

DETAILED DESCRIPTION OF THE DISCLOSURE

Figure 1:
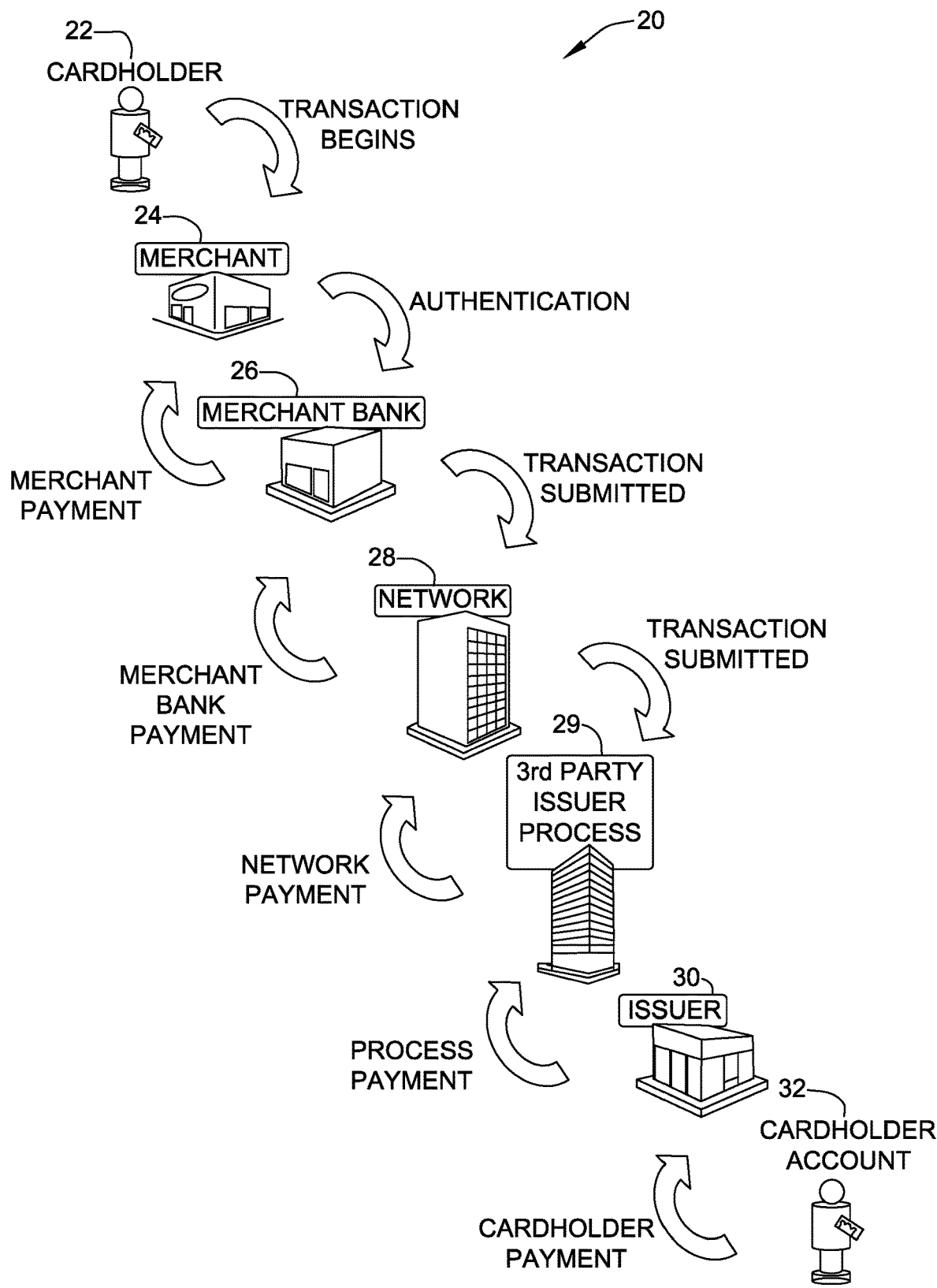
FIG. 1 is a schematic diagram illustrating an example multi-party payment card industry system for enabling ordinary payment transactions in which merchants and card issuers do not necessarily have a one-to-one relationship.

The following detailed description illustrates embodiments of the invention by way of example and not by way of limitation. It is contemplated that the systems and processes described herein have general application to the aspect of processing payment card transactions. More specifically, the embodiments of the systems and methods described herein relate generally to a payment card transaction that is initiated over a first payment network, and a payment services computer system that is associated with a second payment network, wherein the payment services computer system is configured to receive a request from a requestor to apply payment services to the transaction, apply the payment services to the transaction, and transmit an output to the requestor. Because this transaction is initiated on one payment network (i.e., the first payment network), and processed by the payment services computer system on another payment network (i.e., the second payment network), the transaction is sometimes referred to as an off-network transaction. In the example embodiment, an off-network payment card transaction is a payment card transaction that is initiated and processed over a payment network that is different from the payment network providing payment services to the transaction.

Described in detail herein are example embodiments of systems and methods for applying off-network payment services to a home payment network payment transaction. The systems and methods facilitate, for example, applying off-network payment services such as cardholder authorization controls to an home payment network payment transaction, wherein the authorization controls are configured to identify, for example, whether the transaction was initiated outside a geographical region allowed by the authorization controls. The systems and methods described herein include a payment services computer system configured to receive a request associated with an payment transaction from a first payment network (i.e., a payment network that is not hosting the payment services) at a second payment network (i.e., a payment network that is hosting the payment services), and apply the payment services, as appropriate, to the payment transaction.

The methods and systems described herein may be implemented using computer programming or engineering techniques including computer software, firmware, hardware or any combination or subset thereof, wherein the technical effect may be achieved by performing at least one of the following steps: (a) receiving a service request generated by a requestor at the payment services computer system wherein the service request relates to a first payment network payment card transaction and the service request has a first format that is readable by a second payment network; (b) determining, at the payment services computer system, the payment services the service request is registered to receive; (c) processing the service request by applying the registered payment services to the service request; (d) generating a services response based at least in part on the registered payment services and the payment transaction data; and (e) transmitting the service response to at least one of the card holder and the requestor.

As used herein, an acquiring bank, or acquirer, is typically a bank at which a merchant holds an account. Further, an issuing bank, or issuer, is typically a bank at which a customer, or cardholder, holds an account. The account may be debited or charged through the use of a debit card, a credit card, or another type of payment card as described herein.

As used herein, the terms "payment card," "financial transaction card," and "transaction card" refer to any suitable payment card, such as a credit card, a debit card, a prepaid card, a charge card, a membership card, a promotional card, a frequent flyer card, an identification card, a gift card, and/or any other device that may hold payment account data, such as mobile phones, smartphones, personal digital assistants (PDAs), key fobs, and/or computers. Each type of payment card can be used as a method of payment for performing a transaction. In addition, cardholder account behavior can include but is not limited to purchases, management activities (e.g. balance checking), bill payments, achievement of targets (meeting account balance goals, paying bills on time), and/or product registrations (e.g. mobile application downloads).

As used herein, the term "translation module" and related terms, e.g., "translation module system," refers to a method of converting service requests from a format used on the first payment network (e.g., by the issuer bank) to a format that may be read by the second payment network and vice versa. The translation module may include, without limitation, a data layout protocol, an algorithm for mapping service requests from the first payment network format to the second payment network format and vice versa, and an automated program that converts service requests from the first payment network format to the second payment network format and vice versa.

As used herein, the term "home payment network" and related terms, e.g., "home network," refers to a first payment network where the cardholder originates payment card transactions and registers for payment services. Such home payment networks may include any payment networks capable of using the system and method described herein.

As used herein, the term "off-network payment network" and related terms, e.g., "off-network," may refer to a second payment network that is different from the home payment network where a payment card transaction is originated. As used herein, off-network payment network is capable of receiving service requests from home payment network and providing payment services for payment card transactions originating with home payment network.

As used herein, the term "network processor" and related terms, e.g., "off-network processor" and "home network processor," refers to computing device(s) associated with a payment network that may be used to communicate data between computing devices associated with an issuer bank, a cardholder, a merchant, or an acquirer bank and communicate with computing device(s) that may be used to provide network services such as payment services. Also, as used herein, the home network processor may be configured to receive requests from an issuer bank and send first service requests to the translation module.

As used herein, the term "requestor" refers to the creator and sender of a first service request based upon account registration or a payment transaction. The requestor may be either an issuer bank or the home network processor. Also, as used herein, the requestor generates the first service request and uses the translation module to convert it to a second service request.

As used herein, a processor may include any programmable system including systems using microcontrollers, reduced instruction set circuits (RISC), application specific integrated circuits (ASICs), logic circuits, and any other circuit or processor capable of executing the functions described herein. The above examples are example only, and thus are not intended to limit the definition and/or meaning of the term "processor" in any way.

In one embodiment, computer-executable instructions are provided and are embodied on a non-transitory computer readable storage medium. The computer-executable instructions cause a computer executing the instructions to utilize a Structured Query Language (SQL) with a client user interface front-end for administration and a web interface for standard user inputs and reports. In an example embodiment, the system is web-enabled and is run on a business entity intranet. In an alternative embodiment, the system is fully accessible by individuals having authorized access from outside a firewall of the business-entity through the Internet. In a further alternative embodiment, the system is run in a Windows® environment (Windows is a registered trademark of Microsoft Corporation, Redmond, Wash.). The application is flexible and designed to run in various different environments without compromising any major functionality.

FIG. 1 is a schematic diagram illustrating an example multi-party payment card industry system 20 for enabling ordinary payment transactions in which merchants 24 and card issuers 30 do not necessarily have a one-to-one relationship. Embodiments described herein may relate to a payment card system, such as a credit card payment system using the MasterCard® interchange network (MasterCard is a registered trademark of MasterCard International Incorporated located in Purchase, N.Y.). The MasterCard interchange network is a set of proprietary communications standards promulgated by MasterCard International Incorporated for the exchange of financial transaction data and the settlement of funds between financial institutions that are members of MasterCard International Incorporated. In a typical payment card system, a financial institution called the "issuer" issues a payment card, such as a credit card, to a consumer or cardholder 22, who uses the payment card to tender payment for a purchase from a merchant 24. To accept payment with the payment card, merchant 24 must normally establish an account with a financial institution that is part of the financial payment system. This financial institution is usually called the "merchant bank," the "acquiring bank," or the "acquirer." When cardholder 22 tenders payment for a purchase with a payment card, merchant 24 sends an authorization request message to a merchant bank 26 for the amount of the purchase. The request may be performed over the telephone, but is usually performed through the use of a point-of-sale device, which reads cardholder's 22 account data from a magnetic stripe, a chip, or embossed characters on the payment card and communicates electronically with the transaction processing computers of merchant bank 26. Alternatively, merchant bank 26 may authorize a third party to perform transaction processing on its behalf. In this case, the point-of-sale device will be configured to communicate with the third party. Such a third party is usually called a "merchant processor," an "acquiring processor," or a "third party processor."

Using an interchange network 28, computers of merchant bank 26 will communicate transaction data with computers of an issuer processor 29 associated with an issuer 30. Issuer processor 29 may be a third party processor authorized to perform transaction-related services on behalf of issuer 30, including payment card production services, payment card processing services, fraud detection services, data delivery services, ATM driving services, transaction research, and cardholder support services. Issuer processor 29 may also provide interbank switch processing, including authorization, clearing and settlement, and value-added services. This enables issuer 30 to use one card processor for all different payment card brands. In an alternative embodiment, issuer processor 29 may be associated with interchange network 28 and may provide similar services.

Issuer 30 receives the transaction data from issuer processor 29, and then determines whether cardholder's 22 account 32 is in good standing and whether the purchase is covered by cardholder's 22 available credit limit. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale device. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer 30 stores the payment card data, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, issuer processor 29, and issuer 30. More specifically, during and/or after the clearing process, additional data, such as a time of purchase, a merchant name, a type of merchant, purchase data, cardholder account data, a type of transaction, itinerary data, data regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, interchange network 28, issuer processor 29, and issuer 30. Settlement refers to the transfer of financial data or funds among merchant's 24 account, merchant bank 26, issuer processor 29, and issuer 30 related to the transaction. Usually, transactions are captured and accumulated into a "batch," which is settled as a group. More specifically, a transaction is typically settled between issuer 30 and issuer processor 29, and then between issuer processor 29 and interchange network 28, and then between interchange network 28 and merchant bank 26, and then between merchant bank 26 and merchant 24.

Figure 2:
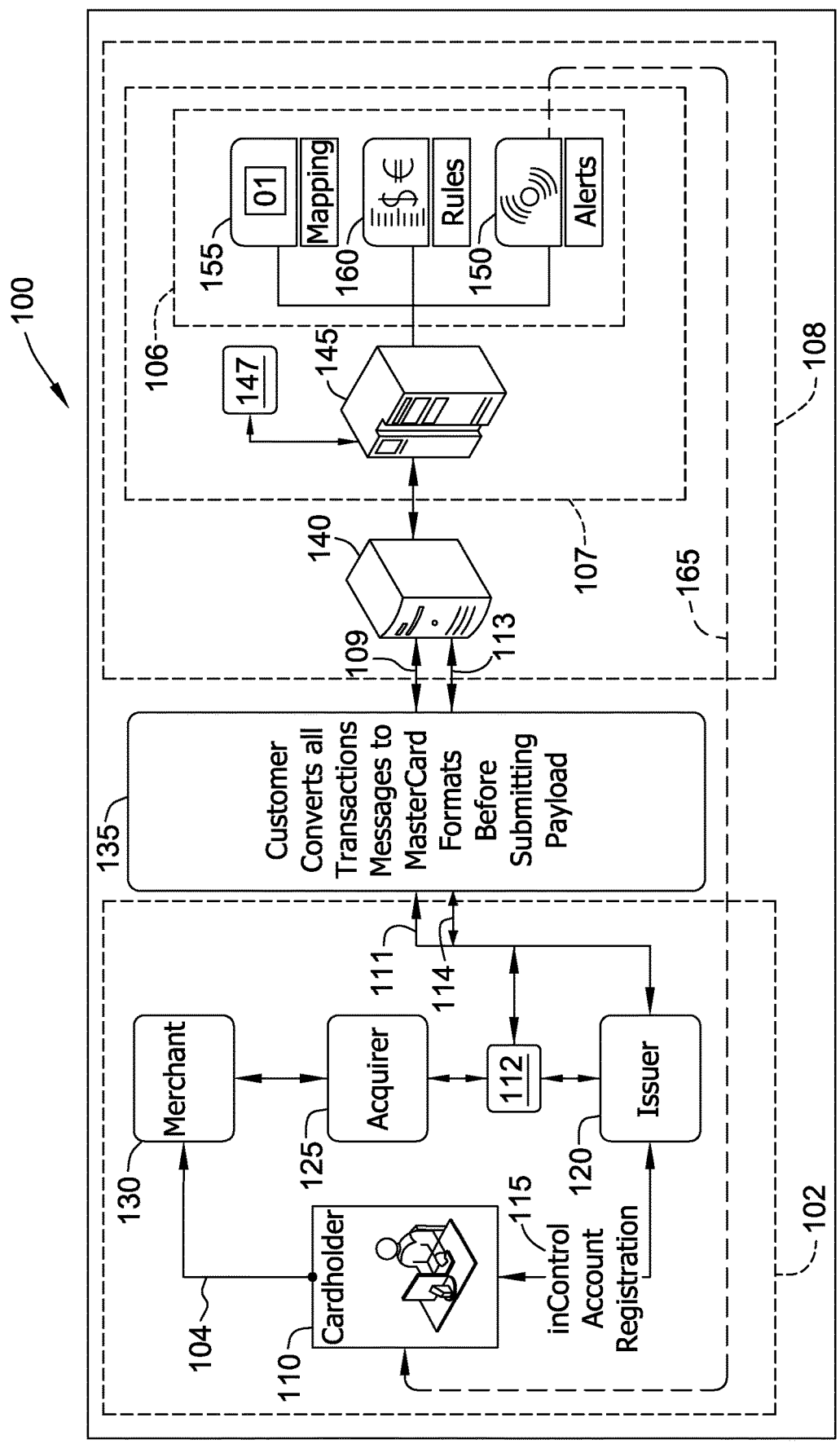
FIG. 2 is a data flow diagram showing a payment processing environment in accordance with one embodiment of the present disclosure.

FIG. 2 is a data flow diagram showing a payment processing environment 100 in accordance with one embodiment of the present disclosure. Environment 100 includes a home payment network 102 where a payment transaction 104 or account registration 115 originates and a first service request 111 is sent, a transfer process 135 where first service request 111 is converted to a second service request 109, and an off-network payment network 108 where a payment services computer system 107 resides.

Home payment network 102 includes a cardholder 110, an issuer 120, an acquirer 125, a merchant 130, and home network processor 112. Cardholder 110 is capable of making payment transaction 104 to merchant 130. Cardholder is also capable of account registration 115 with issuer 120. Home payment network 102 is capable of communicating with off-network payment network 108 by sending first service request 111 associated with account registration 115 and/or payment transaction 104 to transfer process 135. First service request 111 may be sent by home network processor 112 or issuer 120.

Transfer process 135 is configured to allow first service request 111 to be converted to second service request 109 that may be processed using payment services computer 107 at off-network payment network 108. Transfer process 135 includes converting first service request 111 into second service request 109 using a translation module. In the example embodiment, the translation module refers to a data layout protocol indicating a method of converting a first data file format associated with home payment network 102 (e.g., first service request 111) to a second data file format associated with off-network payment network 108 (e.g., second service request 109). In alternative embodiments, the translation may include, without limitation, an algorithm for mapping service requests from the first data file format to the second data file format, or an automated program that converts first service request 111 to second service request 109. Transfer process 135 is also configured to send second service request 109 to an interface processor 140 at off-network payment network 108. Transfer process 135 further includes allowing first services responses 113 to be converted to second services responses 114 (described below). The transfer module is accordingly also configured to convert a second data file format associated with off-network payment network 108 to a first data file format associated with home payment network 102.

Off-network payment network 108 includes interface processor 140, an off-network processor 147, and payment services computer system 107. Interface processor 140 is representative of a computing device capable of receiving second service request 109 from transfer process 135. Interface processor 140 is also capable of determining whether second service request 109 contains account identifiers associated with payment card services 106. Interface processor 140 is further capable of communicating with payment services computer system 107 to register or apply payment services 106.

Payment services computer system 107 includes a payment services platform 145, such as the MasterCard® inControl™ platform. MasterCard® inControl™ platform is a proprietary payment services platform created by MasterCard International Incorporated® for providing cardholder services associated with the exchange of financial transaction data between financial institutions that are members of MasterCard International Incorporated®. (MasterCard is a registered trademark of MasterCard International Incorporated located in Purchase, N.Y.). Payment services platform 145 is capable of communicating with interface processor 140 and registering an account to use payment services 106 or applying payment services 106 associated with home payment network 102 to payment transaction 104. Payment services computer system 107 also includes off-network processor 147 which is capable of communicating with off-network issuer bank (not shown) and providing payment services 106 to transactions initiated by an off-network cardholder (not shown).

In operation, cardholder 110 initially registers for payment services 106 with issuer 120 using account registration 115. In the example embodiment, account registration 115 represents a web-based service allowing cardholder 110 to register for payment services 106 at a web-site hosted by issuer 120. In the example embodiment, issuer 120 transmits registration information to home network processor 112 which converts registration information using transfer process 135 to a format that may be received by interface processor 140. In alternative embodiments, issuer 120 may convert registration information using transfer process 135 without using home network processor 112. In the example embodiment, account registration 115 includes an account identifier (e.g., an account number) associated with the payment card used for initiating transaction 104. The account identifier may be a primary account number (PAN), a real card number (RCN), or any other type of identifier that identifies or represents an account associated with payment card transaction 104.

Account registration 115 further includes payment services 106 to be associated with the account identifier. In the example embodiment, alert notifications service 150 may be associated with the account identifier associated with payment transaction 104. Alert notifications service 150 may be registered so that if payment transaction 104 exceeds a threshold currency amount set in account registration 115, alerts will be sent. In other words, when cardholder 110 registers with issuer 120 for payment services 106, cardholder 110 can register for alert notifications service 150 such that, when a transaction 104 exceeds a designated amount, the payment services computer system 107 sends an alert notification to cardholder 110 advising cardholder 110 of such event.

Account registration 115 also includes using transfer process 135 to convert registration data to a format that can be used with payment services computer system 107. Transfer process 135 uses the translation module to convert registration data into a registration profile and transmits the registration profile to payment services computer system 107. Here, the translation module is used to convert a first data file format associated with home payment network 102 (e.g., registration data) to a second data file format associated with off-network payment network 108 (e.g., the registration profile).

Once cardholder 110 has registered 115 for payment services 106 and the registration profile has been transmitted to interface processor 140 and sent to payment services computer system 107, payment services computer system 107 is capable of providing payment services 106 when cardholder 110 initiates payment transaction 104 over home payment network 102.

Cardholder 110 further initiates payment transaction 104 over home payment network 104 with merchant 130 using a payment card. Payment transaction 104 includes an account identifier (e.g., a PAN) and transaction details. Payment transaction 104 also includes payment transaction data. The payment transaction data may include, without limitation, the time of payment transaction 104, the date of payment transaction 104, the amount of payment transaction 104, merchant 130 associated with payment transaction 104, the category associated with merchant 130 associated with payment transaction 104, the geographic location of payment transaction 104, and the purchase category (e.g., food, clothing, or computers) of payment transaction 104.

Merchant 130 then sends an authorization request over home payment network 102 for payment transaction 104 to acquirer 125. Acquirer 125 sends the authorization request along to issuer 120. In one embodiment, acquirer 125 transmits the authorization request to home network processor 112 which determines whether the account associated with payment transaction 104 is eligible for payment services 106. In alternative embodiments, home network processor 112 sends the authorization request to issuer 120 and issuer 120 determines whether the account associated with payment transaction 104 is eligible for payment services 106. The entity that determines whether the account associated with payment transaction 104 is eligible for payment services 106 is defined as a requestor and generates first service request 111. Determining whether the account is eligible for payment services 106 is representative of determining whether cardholder 110 has registered the account identifier included in the authorization request with payment services 106. In the example embodiment, home network processor 112 will search a memory device (not shown) to determine if the account identifier is registered with issuer 120 for payment services 106. In other embodiments, issuer 120 will search a memory device (not shown) to determine if the account identifier is registered with issuer 120 for payment services 106. In alternative embodiments, issuer 120 may send a request to off-network payment network 108 to determine if the account identifier included in the authorization request is registered with payment services 106.

If the account is eligible, the requestor (i.e., home network processor 112 or issuer 120) will continue to process payment transaction 104, and will generate first service request 111. First service request 111 is converted, using transfer process 135, into second service request 109. Transfer process 135 uses the translation module to convert first service requests 111 to second service requests 109. The translation module ensures that second service requests 109 conform to identical file naming conventions, file header conventions, file structure and layout conventions, file type conventions, and file size conventions. In an alternative embodiment, first service requests 111 are converted using a translation module implementing XML-based transformational methods. In other embodiments, first service requests 111 may be converted using translation modules implementing any transformational method or language including, without limitation, Perl, AWK, TXL, or any other method capable of converting first service requests 111 to apply names, headers, layouts, structures, file types, and file sizes required for second service requests 109.

Second service request 109 is transmitted to and received by interface processor 140 which determines whether the account identifier associated with second service request 109 is registered for payment services 106. If the account identifier associated with second service request 109 is determined to be registered for payment services 106, interface processor 140 transmits second service request 109 to payment services platform 145. Payment services platform 145 processes second service request 109 by applying registered payment services 106 to second service request 109. Applying registered payment services 106 represents applying at least one payment service 106 if second service request 109 requires such application. Payment services 106 includes virtual card mapping service 155, transaction rules and limits service 160, and alert notifications service 150. Each payment service 106 is associated with rules and conditions for applying service 106. If payment service 106 should be applied, payment services platform 145 generates first services response 113 based, at least in part, on payment services 106 and payment transaction data associated with second service request 109. Payment services computer system 107 transmits first services response 113 to interface processor 140. First services response 113 is then sent back to transfer process 135.

Here, transfer process 135 uses the translation module to facilitate converting first services responses 113 into second services responses 114. The translation module is now used to reverse the process described when first service request 111 was converted to second service request 109. The transfer module allows the a reversed conversion of first services responses 113 into second services responses 114 conforming to identical file naming conventions, file header conventions, file structure and layout conventions, file type conventions, and file size conventions associated with home payment network 102. In the example embodiment, first services responses 113 are converted using a translation module implementing XML-based transformational methods. In alternative embodiments, first services responses 113 may be converted using translation modules implementing any transformational method or language including, without limitation, Perl, AWK, TXL, or any other method capable of converting first services responses 113 to apply names, headers, layouts, structures, file types, and file sizes required for second services responses 114.

Second services response 114 is then transmitted back to the requestor (i.e., home network processor 112 or issuer 120) that sent first service request 111 to transfer process 135. In the example embodiment, when the requestor is home network processor 112, the requestor will communicate with acquirer 125 (e.g., return an authorization response denying a credit card transaction to merchant 130 based upon the application of transaction rules and limits service 160) and/or cardholder 110 (e.g. to alert cardholder based upon the application of alert notifications service 150) depending on the contents of second services response 114. In alternative embodiments, when the requestor is issuer 120, the requestor will either act on the contents of second services response 114 (e.g., instruct acquirer 125 to deny a credit card transaction based upon the application of transaction rules and limits service 160) or communicate with cardholder 110 (e.g. to alert cardholder based upon the application of alert notifications service 150.)

Payment transaction 104 may be associated with an account identifier that is registered for alert notifications service 150. In this example, payment transaction 104 is processed as described above and results in at least one of two outcomes. First, first services response 113 may be generated and converted to second services response 114 resulting in alerting cardholder 110 that the payment card associated with cardholder 110 has been used in payment transaction 104. Second, payment services 106 may trigger an SMS (i.e., Short Message Service text messaging) or email alert 165 sent directly from payment services computer system 107.

In the first example, cardholder 110 may use account registration 115 which creates a registration profile on payment services computer system 107. The registration profile may include information reflecting that cardholder 110 would like to be notified by the requestor (i.e., home network processor 112 or issuer 120) when the credit card balance associated with cardholder 110 exceeds a threshold of $3,000. The registration profile is therefore registered for alert notifications service 150 with this condition (i.e., alerts should be sent by the requestor when the credit card balance exceeds $3,000) applied. Payment transaction 104 is made for $500 using account identifiers corresponding to cardholder 110 with merchant 130. Prior to payment transaction 104, the credit card balance associated with cardholder 110 was $2,900. Payment transaction 104 results in first service request 111 being generated by the requestor (i.e., home network processor 112 or issuer 120). First service request 111 is converted using transfer process 135 to second service request 109. Second service request 109 is received by interface processor 140 which determines that the account identifier associated with second service request 109 is registered for payment services 106 and transmits second service request 109 to payment services platform 145. Payment services platform 145 determines that second service request 109 is associated with an account identifier which is registered for alert notifications service 150. Payment services platform 145 processes second service request 109 and determines that payment transaction data included indicates that second service request 109 is associated with payment transaction 104 which has moved the credit card balance associated with cardholder 110 to $3,400. Payment services platform 145 also determines alert notifications service 150 requires that the requestor (i.e., home network processor 112 or issuer 120) must alert cardholder 110. Payment services platform 145 generates first services response 113 including an instruction that the requestor send an alert to cardholder 110 in accordance with alert notifications service 150. First services response 113 is converted to second services response 114 using transfer process 135. Second services response 114 is sent to the requestor. The requestor sends an electronic alert to a computing device associated with cardholder 110 indicating that the credit card balance associated with cardholder 110 has exceeded the threshold of $3,000.

In the second example, cardholder 110 also uses account registration 115 and creates a registration profile on payment services computer system 107. However, in this example, the registration profile may include information reflecting that cardholder 110 would like to be notified by payment services computer system 107 (rather than the requestor) when the credit card balance associated with cardholder 110 exceeds a threshold of $3,000. The registration profile is therefore registered for alert notifications service 150 with this condition (i.e., alerts should be sent by payment services computer system 107 when the credit card balance exceeds $3,000) applied. As in the first example, payment transaction 104 causes the credit card balance associated with cardholder to exceed $3,000. Again, payment transaction 104 results in first service request 111 being generated by the requestor. First service request 111 is again converted using transfer process 135 to second service request 109. Second service request 109 is received by interface processor 140 which determines that the account identifier associated with second service request 109 is registered for payment services 106 and transmits second service request 109 to payment services platform 145. Payment services platform 145 determines that second service request 109 is associated with an account identifier which is registered for alert notifications service 150. However, payment services platform 145 determines that second service request 109 is associated with an account identifier which is registered for SMS or email alerts 165 from payment services computer system 107. In this case, in addition to generating an first services response 113 (informing the requestor of the alert), payment services computer system 107 sends an SMS text message directly to a computing device associated with cardholder 110. This option may be valuable for cardholders 110 who value speed or where the requestor lacks the ability to communicate with cardholder 110 electronically.

Payment transaction 104 may also be associated with an account identifier that is registered for virtual card mapping service 155. In this case cardholder 110 may use account registration 115 which creates a registration profile on payment services computer system 107. The registration profile may include information reflecting that cardholder 110 would like to be able to use a virtual card number (VCN) in conjunction with payment transactions 104 wherein the VCN maps to a real card number (RCN). The RCN directly represents the real number associated with, and typically printed on, a payment card. The VCN is a secondary number that only reflects the RCN based upon a mapping service provided by virtual card mapping service 155. A VCN is issued with the possibility of cardholder 110 deactivating it immediately without impacting the underlying account and RCN. Accordingly, cardholder 110 may find the use of VCNs and virtual card mapping service 155 desirable because it enables rapid fraud prevention and account control. This is because cardholder 110 can restrict the ability of a VCN to be used without disabling or affecting the RCN.

In these cases, cardholder 110 may initiate payment transaction 104 using a VCN. Payment transaction 104 results in first service request 111 being generated by the requestor (i.e., home network processor 112 or issuer 120). First service request 111 is converted using transfer process 135 to second service request 109. Second service request 109 is received by interface processor 140 which determines that the account identifier is registered for payment services 106 and transmits second service request 109 to payment services platform 145. Payment services platform 145 determines that second service request 109 is associated with an account identifier which is a VCN. Payment services platform 145 identifies RCN associated with VCN by applying virtual card mapping service 155. Payment services platform 145 processes second service request 109 and determines whether RCN is associated with any additional payment services 106. Payment services platform 145 generates first services response 113 including instruction that issuer 120 use the RCN with payment transaction 104. First services response 113 is converted to second services response 114 using transfer process 135. Second services response 114 is sent to the requestor. In the example embodiment, when the home network processor 112 is the requestor, the requestor sends second services response 114 to issuer 120. In the alternative embodiment, where the requestor is issuer 120, the issuer immediately receives second services response 114 after the transfer process 135. In all embodiments, issuer 120 then processes payment transaction 104 using the RCN.

In some cases, payment services platform 145 may send first services response 113 without an initiating payment transaction 104. First services response 113 is converted, using transfer process 135, to second services response 114. In these cases, payment services platform 145 provides the requestor virtual card mapping data without an first service request 111 associated with payment transaction 104. The requestor either transmits virtual card mapping data to issuer 120 (where the requestor is home network processor 112) or the requestor is issuer 120 (i.e. issuer 120 has the virtual card mapping data). Issuer 120 can store virtual card mapping data in its database. In these cases, issuer 120 may be able to convert a VCN for cardholder to an RCN immediately without using off-network payment network 108. In such cases, payment services platform 145 (and more generally, payment services computer system 107) provide virtual card mapping data to issuer to allow for rapid processing of payment transactions 104 associated with a VCN (i.e., payment transactions 104 which are associated with account identifiers registered to use virtual card mapping service 155).

Payment services 106 also include transaction rules and limits service 160. Cardholder 110 can register to have transaction rules and limits service 160 applied to payment transaction 104. In these embodiments, first services response 113 may be generated and converted to second services response 114 that may deny transactions that do not satisfy transaction rules and limits service 160. For example, cardholder 110 may use account registration 115 which creates a registration profile on payment services computer system 107. The registration profile may include information reflecting that cardholder 110 would like to deny any payment transactions 104 which take place outside of New York, the home state of cardholder 110, as a deterrent to fraud. The registration profile is therefore registered for transaction rules and limits service 160 with this condition (i.e. all transactions must take place in New York) applied. Payment transaction 104 is made with account identifiers corresponding to cardholder 110 with merchant 130 in Ohio. Payment transaction 104 results in first service request 111 being generated by the requestor (i.e., home network processor 112 or issuer 120). First service request 111 is converted using transfer process 135 to second service request 109. Second service request 109 is received by interface processor 140 which determines that the account identifier associated with second service request 109 is registered for payment services 106 and transmits second service request 109 to payment services platform 145. Payment services platform 145 determines that second service request 109 is associated with an account identifier which is registered for transaction rules and limits service 160. Payment services platform 145 processes second service request 109 and determines that payment transaction data included indicates that second service request 109 is associated with payment transaction 104 taking place in Ohio. Payment services platform 145 further determines that the account identifier associated with second service request 109 is registered for transaction rules and limits service 160 and requires that all transactions must take place in New York. Payment services platform 145 accordingly determines that payment transaction 104 should be denied for failing to adhere to the specified rule. Payment services platform 145 generates first services response 113 including an instruction that issuer 120 deny payment transaction 104 for violating conditions of transaction rules and limits service 160. In other examples, transaction rules and limits service 160 may apply a similar process for customers specifying rules including, without limitation, all payment transactions 104 must be associated with a certain category or categories (e.g., food, clothing, and gasoline), all payment transactions 104 must be for less than a maximum allowable spending limit, payment transactions 104 cannot be more frequent than a given period (e.g., one transaction per day), payment transactions 104 cannot occur outside specific hours (e.g., no purchase after midnight), and no payment transactions 104 can be for a prohibited category of purchase (e.g., no purchase of alcohol). First services response 113 is sent to interface processor 140, converted to second services response 114 using transfer process 135 and sent to the requestor. The requestor either is issuer 120 or home network processor 112. The requestor in either case instructs acquirer 125 to authorize or deny the payment transaction 104 by sending an authorization response to merchant 130.

Figure 3:
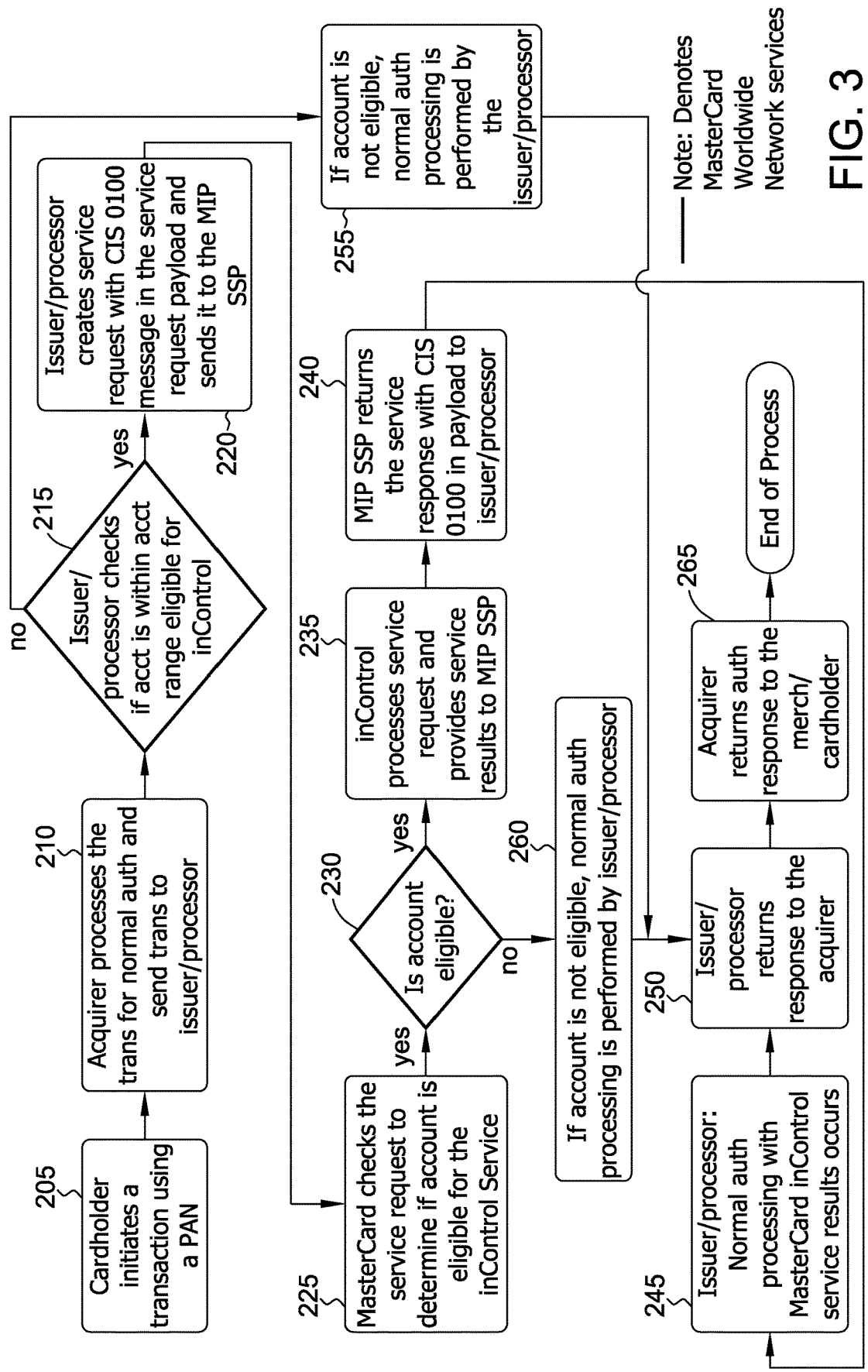
FIG. 3 is a flowchart illustrating an example method implemented by the payment services computer system shown in FIG. 2 for processing a home payment network payment transaction using off-network payment services.

FIG. 3 is a flowchart 200 illustrating an example method implemented by the payment services computer system shown in FIG. 2 for processing a home payment network payment transaction using off-network payment services. Cardholder 110 initiates 205 payment transaction 104 using an account identifier (e.g., a PAN). Acquirer 125 then processes payment transaction 104 for normal authorization and sends 210 payment transaction 104 to the requestor (i.e. home network processor 112 or issuer 120). In the example embodiment, where the requestor is home network processor 112, acquirer 125 sends 210 payment transaction 104 to home network processor 112. In alternative embodiments, issuer 120 is the requestor and acquirer 125 sends 210 payment transaction 104 to issuer 120. The requestor (i.e. home network processor 112 or issuer 120) then checks 215 if the account is within the account range eligible for payment services 106. If the account is not eligible, normal authorization processing is performed 255 by issuer 120 and issuer 120 returns 250 a normal authorization response to acquirer 125 and acquirer 125 returns 265 the authorization response to merchant 130 and cardholder 110. If the account is eligible for payment services 106, the requestor (i.e. home network processor 112 or issuer 120) sends 220 a service request message (i.e., second service request 109 converted from first service request 111 using transfer process 135) to interface processor 140. Interface processor 140 sends (not shown) second service request 109 to payment services platform 145. Payment services platform 145 checks 225 second service request 109 to determine if the account is eligible for payment services 106. If the account is not eligible 230, normal authorization processing is performed 260 by issuer 120 and issuer 120 returns a normal authorization response 250 to acquirer 125 and acquirer 125 returns 265 the authorization response to merchant 130 and cardholder 110. If the account is eligible 230 for payment services 106, payment services platform 145 processes second service request 109 and generates 235 an first services response 113. Payment services response also provides 235 first services response 113 to interface processor 140. Interface processor 140 returns 240 off-network service response 113 to the requestor (i.e. home network processor 112 or issuer 120). In returning 240 first services response 113, first services response 113 is converted to second services response 114 using transfer process 135. Issuer 120 executes normal authorization with payment services 245. The requestor then returns 250 the authorization response to acquirer 125 and acquirer 125 returns 265 the authorization response to merchant 130 and cardholder 110.

Figure 4:
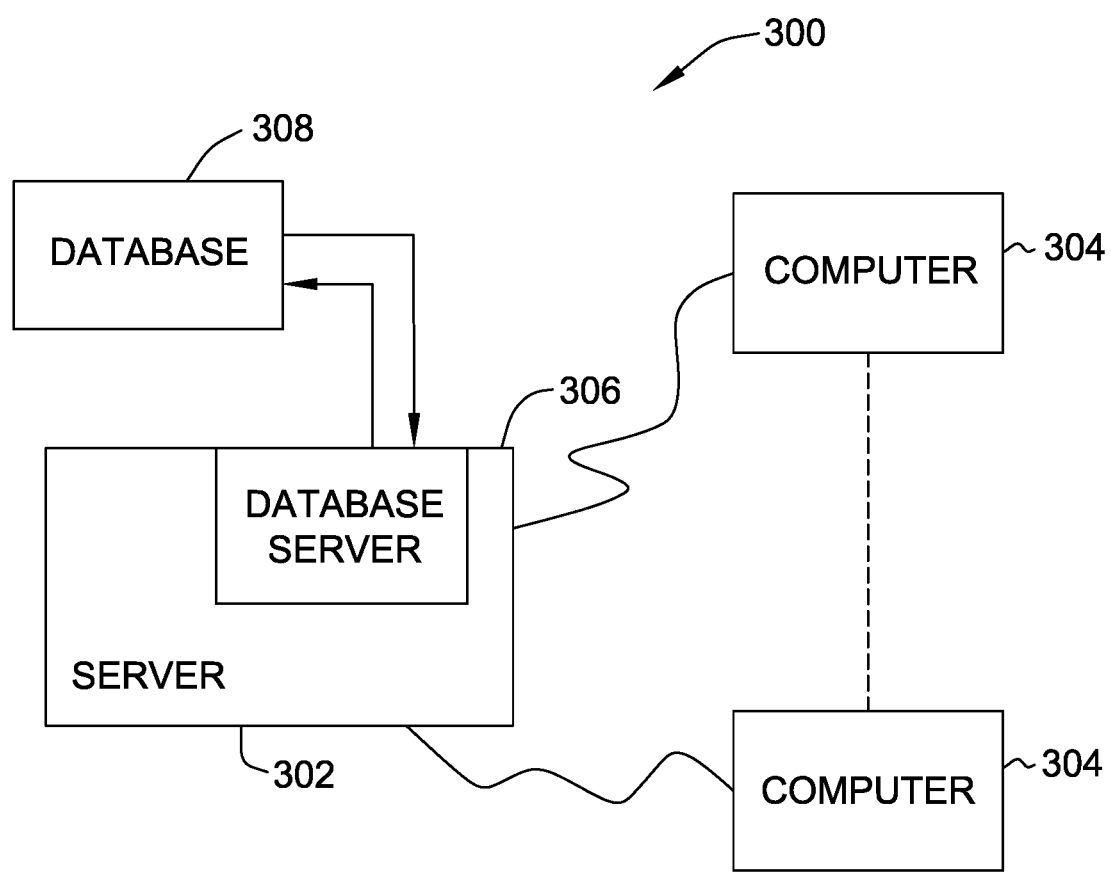
FIG. 4 is a simplified block diagram of an example computer system representative of the payment services platform in the payment processing environment, shown in FIG. 2.

FIG. 4 is a simplified block diagram of an example computer system 300 representative of payment services platform 145 in payment processing environment 100 (both shown in FIG. 2). In the example embodiment, system 300 includes a server system 302 and a plurality of client subsystems, also referred to as client systems 304, connected to server system 302. In one embodiment, client systems 304 are computers including a web browser, such that server system 302 is accessible to client systems 304 using the Internet. Client systems 304 are interconnected to the Internet through many interfaces including a network, such as a local area network (LAN) and/or a wide area network (WAN), dial-in connections, cable modems, wireless-connections, and special high-speed ISDN lines. Client systems 304 may be any device capable of interconnecting to the Internet including a web-based phone, personal digital assistant (PDA), or other web-connectable equipment. A database server 306 is connected to a database 308 containing information on a variety of matters, as described below in greater detail. In one embodiment, database 308 is stored on server system 302 and may be accessed by potential users at one of client systems 304 by logging onto server system 302 through one of client systems 304. In any alternative embodiment, database 308 is stored remotely from server system 302 and may be non-centralized.

As discussed below, payment card information including account numbers, payment card numbers, expiration dates, and account statuses, such as whether the account is open or closed, is stored within database 308. Further, data relating to the cardholder of a payment card may also be stored within database 308. Such cardholder data may include, for example, cardholder name and cardholder billing address.

Figure 5:
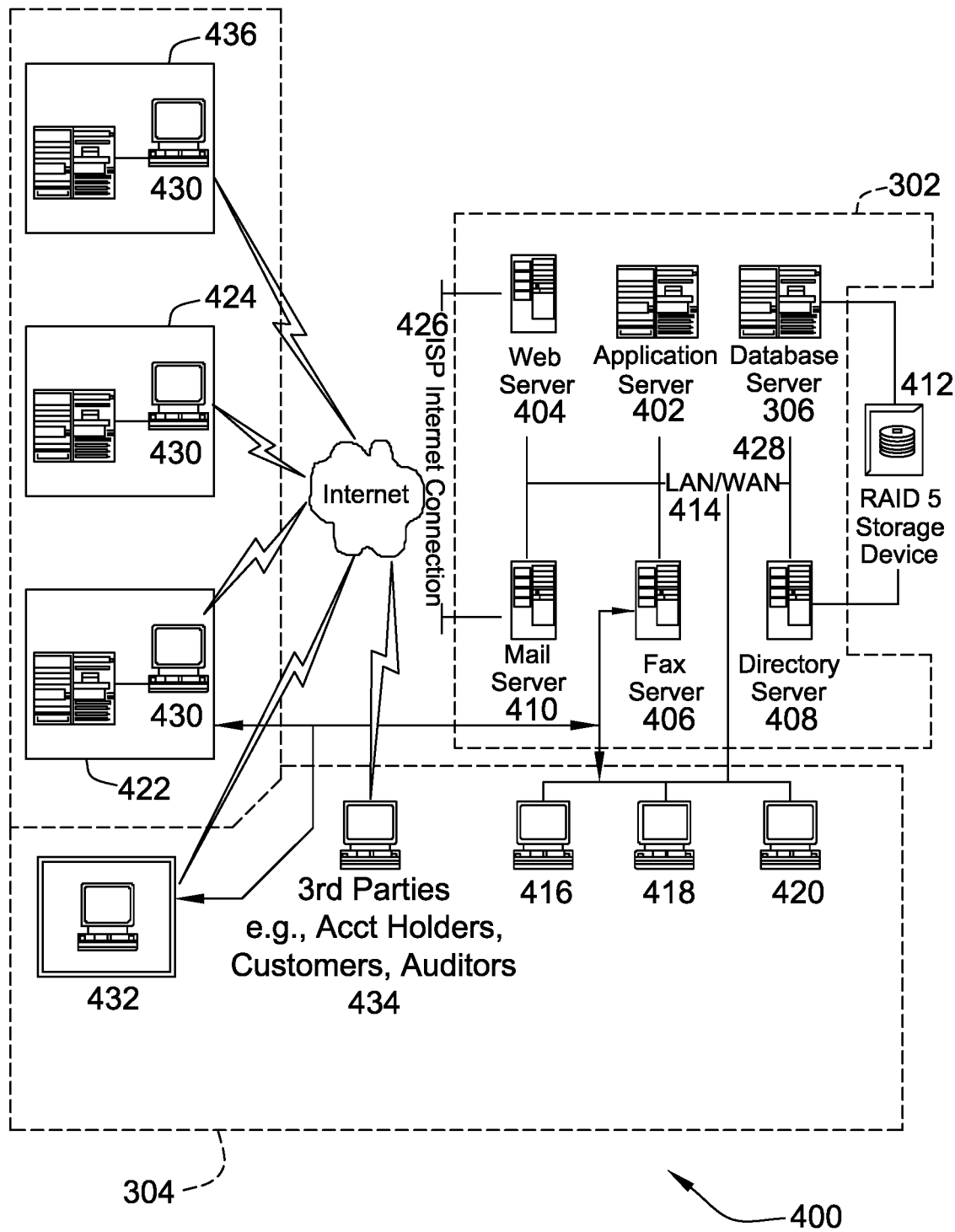
FIG. 5 is an expanded block diagram of an example embodiment of a server architecture of the payment services computer system shown in FIG. 2.

FIG. 5 is an expanded block diagram of an example embodiment of a server architecture of system 400 in accordance with one embodiment of the present invention. Components in system 400, identical to components of system 300 (shown in FIG. 4), are identified in FIG. 5 using the same reference numerals used in FIG. 4. System 400 includes server system 302 and client systems 304. Server system 302 further includes database server 306, an application server 402, a web server 404, a fax server 406, a directory server 408, and a mail server 410. A disk storage unit 412 is coupled to database server 306 and directory server 408. Servers 306, 402, 404, 406, 408, and 410 are coupled in a local area network (LAN) 414. In addition, a system administrator's workstation 416, a user workstation 418, and a supervisor's workstation 420 are coupled to LAN 414. Alternatively, workstations 416, 418, and 420 are coupled to LAN 414 using an Internet link or are connected through an Intranet.

Each workstation, 416, 418, and 420, is a personal computer having a web browser. Although the functions performed at the workstations typically are illustrated as being performed at respective workstations 416, 418, and 420, such functions can be performed at one of many personal computers coupled to LAN 414. Workstations 416, 418, and 420 are illustrated as being associated with separate functions only to facilitate an understanding of the different types of functions that can be performed by individuals having access to LAN 414.

Server system 302 is configured to be communicatively coupled to various entities, including acquirers 422 and issuers 424, and to third parties, e.g., auditors, 434 using an Internet connection 426. Server system 302 may also be communicatively coupled with a merchant 436. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 428, local area network 414 could be used in place of WAN 428.

In the example embodiment, any authorized individual or entity having a workstation 430 may access system 400. At least one of the client systems includes a manager workstation 432 located at a remote location. Workstations 430 and 432 include personal computers having a web browser. Also, workstations 430 and 432 are configured to communicate with server system 302. Furthermore, fax server 406 communicates with remotely located client systems, including a client system 432, using a telephone link. Fax server 406 is configured to communicate with other client systems 416, 418, and 420 as well.

Figure 6:
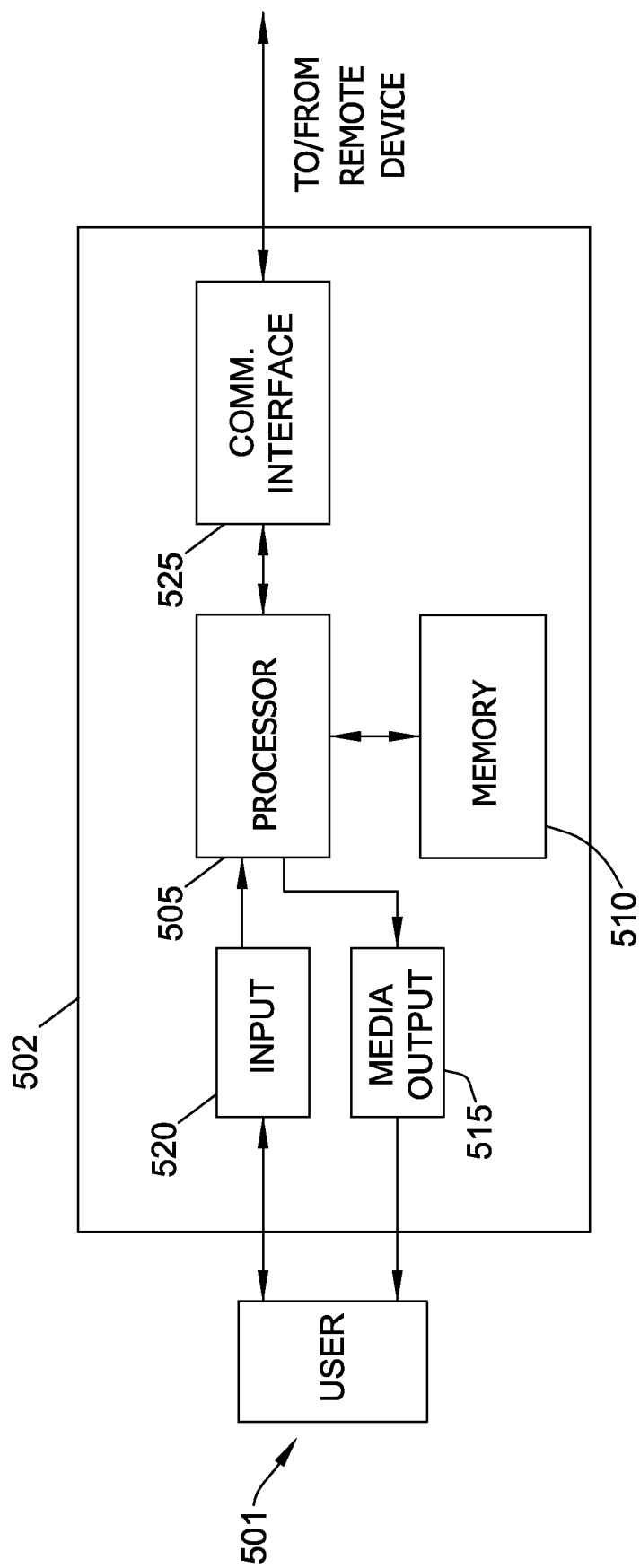
FIG. 6 illustrates an example configuration of a cardholder computer device operated by a cardholder shown in FIGS. 4 and 5.

FIG. 6 illustrates an example configuration of a cardholder computer device 502 operated by a cardholder 501. Cardholder computer device 502 may include, but is not limited to, client systems 304, 416, 418, and 420, workstation 430, and manager workstation 432 (shown in FIG. 5).

Cardholder computer device 502 includes a processor 505 for executing instructions. In some embodiments, executable instructions are stored in a memory area 510. Processor 505 may include one or more processing units (e.g., in a multi-core configuration). Memory area 510 is any device allowing information such as executable instructions and/or other data to be stored and retrieved. Memory area 510 may include one or more computer readable media.

Cardholder computer device 502 also includes at least one media output component 515 for presenting information to cardholder 501. Media output component 515 is any component capable of conveying information to cardholder 501. In some embodiments, media output component 515 includes an output adapter such as a video adapter and/or an audio adapter. An output adapter is operatively coupled to processor 505 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder computer device 502 includes an input device 520 for receiving input from cardholder 501. Input device 520 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 515 and input device 520.

Cardholder computer device 502 may also include a communication interface 525, which is communicatively couplable to a remote device such as server system 302 or a web server operated by a merchant. Communication interface 525 may include, for example, a wired or wireless network adapter or a wireless data transceiver for use with a mobile phone network (e.g., Global System for Mobile communications (GSM), 3 G, 4 G or Bluetooth) or other mobile data network (e.g., Worldwide Interoperability for Microwave Access (WIMAX)).

Stored in memory area 510 are, for example, computer readable instructions for providing a user interface to cardholder 501 via media output component 515 and, optionally, receiving and processing input from input device 520. A user interface may include, among other possibilities, a web browser and client application. Web browsers enable cardholders, such as cardholder 501, to display and interact with media and other information typically embedded on a web page or a website from server system 302 or a web server associated with a merchant. A client application allows cardholder 501 to interact with a server application from server system 302 or a web server associated with a merchant.

Figure 7:
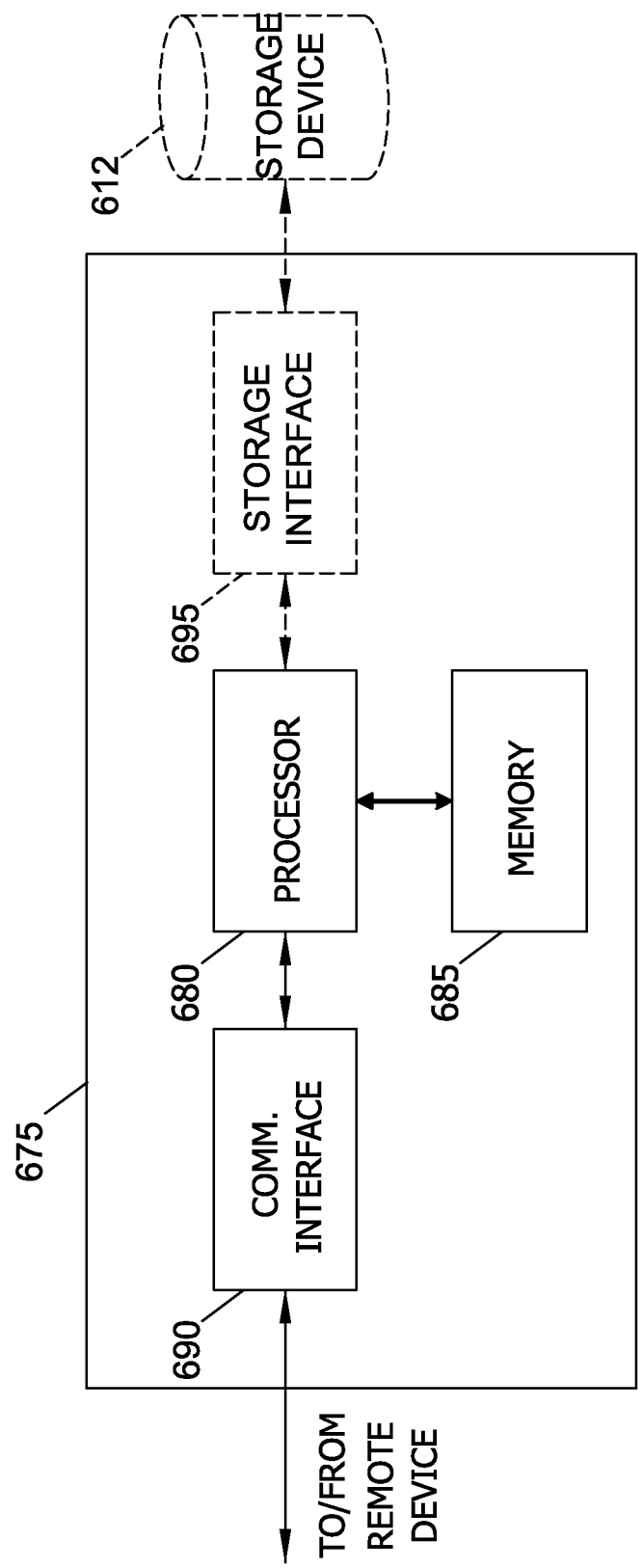
FIG. 7 illustrates an example configuration of the server computer device shown in FIGS. 4 and 5.

FIG. 7 illustrates an example configuration of a server computer device 675 such as server system 302 (shown in FIGS. 4 and 5). Server computer device 675 may include, but is not limited to, database server 306, application server 402, web server 404, fax server 406, directory server 408, and mail server 410.

Server computer device 675 includes a processor 680 for executing instructions. Instructions may be stored in a memory area 685, for example. Processor 680 may include one or more processing units (e.g., in a multi-core configuration).

Processor 680 is operatively coupled to a communication interface 690 such that server computer device 675 is capable of communicating with a remote device such as cardholder computer device 502 or another server computer device 675. For example, communication interface 690 may receive requests from client systems 304 via the Internet, as illustrated in FIGS. 3 and 4.

Processor 680 may also be operatively coupled to a storage device 412. Storage device 412 is any computer-operated hardware suitable for storing and/or retrieving data. In some embodiments, storage device 412 is integrated in server computer device 675. For example, server computer device 675 may include one or more hard disk drives as storage device 412. In other embodiments, storage device 412 is external to server computer device 675 and may be accessed by a plurality of server computer devices 675. For example, storage device 412 may include multiple storage units such as hard disks or solid state disks in a redundant array of inexpensive disks (RAID) configuration. Storage device 412 may include a storage area network (SAN) and/or a network attached storage (NAS) system.

In some embodiments, processor 680 is operatively coupled to storage device 412 via a storage interface 695. Storage interface 695 is any component capable of providing processor 680 with access to storage device 412. Storage interface 695 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 680 with access to storage device 412.

Memory areas 410 and 685 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for applying enrichment services hosted on a second interchange network to a payment transaction initiated over a first interchange network, wherein the first interchange network utilizes a first set of proprietary communications standards for the exchange of financial transaction data and the settlement of funds between financial institutions that are members of the first interchange network and the second interchange network utilizes a second set of proprietary communications standards for the exchange of financial transaction data and the settlement of funds between financial institutions that are members of the second interchange network, said method comprising:

receiving, at a transfer process module hosted on the first interchange network, a first service request from a requestor, wherein the first service request includes request data associated with a corresponding payment transaction over the first interchange network, wherein a payment card used in the corresponding payment transaction has been identified by the requestor as registered for the enrichment services, wherein the first service request has a first set of file characteristics including a first file name, a first file header, and a first file structure each formatted in accordance with the first set of proprietary communications standards and not in accordance with the second set of proprietary communications standards;

transforming, by the transfer process module, the first service request to create a second service request that includes the request data, wherein the second service request has a second set of file characteristics including a second file name, a second file header, and a second file structure each formatted in accordance with the second set of proprietary communications standards and not in accordance with the first set of proprietary communications standards;

receiving, at an enrichment services computer system hosted on the second interchange network, the second service request;

generating, by the enrichment services computer system, a first service response that includes response data based on applying at least one of a virtual card mapping service, a transaction rules and limits service, and an alert notifications service to the payment transaction corresponding to the request data, wherein the first service response has a third set of file characteristics formatted in accordance with the second set of proprietary communications standards and not in accordance with the first set of proprietary communications standards;

receiving, at the transfer process module, the first service response;

transforming, by the transfer process module, the first service response to create a second service response that includes the response data, wherein the second service response has a fourth set of file characteristics formatted in accordance with the first set of proprietary communications standards and not in accordance with the second set of proprietary communications standards; and transmitting, by the transfer process module, the second services response to at least one of a cardholder of the payment card and the requestor.

2. A computer-implemented method in accordance with claim 1, further comprising providing, by the enrichment services computer system, the transfer process module to the requestor for hosting on the first interchange network.

3. A computer-implemented method in accordance with claim 1, wherein applying the at least one of the virtual card mapping service, the transaction rules and limits service, and the alert notifications service to the payment transaction comprises:

retrieving, by the enrichment services computer system using the request data, an account identifier associated with the payment card used in the payment transaction;

confirming, by the enrichment services computer system, that the retrieved account identifier is included in a plurality of registered account identifiers stored within a memory device coupled to the enrichment services computer system; and retrieving, by the enrichment services computer system from the memory device, the at least one of the virtual card mapping service, the transaction rules and limits service, and the alert notifications service associated with the payment card.

4. A computer-implemented method in accordance with claim 1, wherein generating the first service response comprises generating an instruction that an issuer bank associated with the requestor decline the payment transaction based upon a result of the applying the at least one of the virtual card mapping service, the transaction rules and limits service, and the alert notifications service to the payment transaction.

5. A computer-implemented method in accordance with claim 1, wherein applying the at least one of the virtual card mapping service, the transaction rules and limits service, and the alert notifications service to the payment transaction comprises transmitting, by the enrichment services computer system, an alert notification to at least one of a computer device associated with the cardholder and a computer device associated with the requestor, wherein the alert notification causes the at least one of the computer device associated with the cardholder and the computer device associated with the requestor to display the alert notification.

6. A computer-implemented method in accordance with claim 1, wherein transforming the first service request to create the second service request comprises applying a data layout protocol to the first set of file characteristics.

7. A system for applying enrichment services hosted on a second interchange network to a payment transaction initiated over a first interchange network, wherein the first interchange network utilizes a first set of proprietary communications standards for the exchange of financial transaction data and the settlement of funds between financial institutions that are members of the first interchange network and the second interchange network utilizes a second set of proprietary communications standards for the exchange of financial transaction data and the settlement of funds between financial institutions that are members of the second interchange network, said system comprising:

a first computing device hosted on the first interchange network, the first computing device including at least one first processor and a first computer-readable storage device having encoded thereon first computer-executable instructions; and a second computing device hosted on the second interchange network, the second computing device including at least one second processor and a second computer-readable storage device having encoded thereon second computer-executable instructions, wherein:

the first computer-executable instructions are executable to cause the at least one first processor to receive a first service request from a requestor, wherein the first service request includes request data associated with a corresponding payment transaction over the first interchange network, wherein a payment card used in the corresponding payment transaction has been identified by the requestor as registered for the enrichment services, wherein the first service request has a first set of file characteristics including a first file name, a first file header, and a first file structure each formatted in accordance with the first set of proprietary communications standards and not in accordance with the second set of proprietary communications standards;

the first computer-executable instructions are executable to further cause the at least one first processor to transform the first service request to create a second service request that includes the request data, wherein the second service request has a second set of file characteristics including a second file name, a second file header, and a second file structure each formatted in accordance with the second set of proprietary communications standards and not in accordance with the first set of proprietary communications standards;

the second computer-executable instructions are executable to cause the at least one second processor to receive the second service request;

the second computer-executable instructions are executable to further cause the at least one second processor to generate a first service response that includes response data based on applying at least one of a virtual card mapping service, a transaction rules and limits service, and an alert notifications service to the payment transaction corresponding to the request data, wherein the first service response has a third set of file characteristics formatted in accordance with the second set of proprietary communications standards and not in accordance with the first set of proprietary communications standards;

the first computer-executable instructions are executable to further cause the at least one first processor to receive the first service response;

the first computer-executable instructions are executable to further cause the at least one first processor to transform the first service response to create a second service response that includes the response data, wherein the second service response has a fourth set of file characteristics formatted in accordance with the first set of proprietary communications standards and not in accordance with the second set of proprietary communications standards; and the first computer-executable instructions are executable to further cause the at least one first processor to transmit the second services response to at least one of a cardholder of the payment card and the requestor.

8. The system in accordance with claim 7, wherein the second computer-executable instructions are executable to further cause the at least one second processor to provide the first computer-executable instructions to the requestor for installation on the first computing device.

9. The system in accordance with claim 7, wherein the second computer-executable instructions are executable to further cause the at least one second processor to apply the at least one of the virtual card mapping service, the transaction rules and limits service, and the alert notifications service to the payment transaction by:

retrieving, using the request data, an account identifier associated with the payment card used in the payment transaction;

confirming that the retrieved account identifier is included in a plurality of registered account identifiers stored within a memory device coupled to the enrichment services computer system; and retrieving, from the memory device, the at least one of the virtual card mapping service, the transaction rules and limits service, and the alert notifications service associated with the payment card.

10. The system in accordance with claim 7, wherein the second computer-executable instructions are executable to further cause the at least one second processor to generate the first service response by generating an instruction that an issuer bank associated with the requestor decline the payment transaction based upon a result of the applying the at least one of the virtual card mapping service, the transaction rules and limits service, and the alert notifications service to the payment transaction.

11. The system in accordance with claim 7, wherein the second computer-executable instructions are executable to further cause the at least one second processor to apply the at least one of the virtual card mapping service, the transaction rules and limits service, and the alert notifications service to the payment transaction by transmitting an alert notification to at least one of a computer device associated with the cardholder and a computer device associated with the requestor, wherein the alert notification causes the at least one of the computer device associated with the cardholder and the computer device associated with the requestor to display the alert notification.

12. The system in accordance with claim 7, wherein the first computer-executable instructions are executable to further cause the at least one first processor to transform the first service request to create the second service request by applying a data layout protocol to the first set of file characteristics.

13. Non-transitory computer-readable storage media for applying enrichment services hosted on a second interchange network to a payment transaction initiated over a first interchange network, wherein the first interchange network utilizes a first set of proprietary communications standards for the exchange of financial transaction data and the settlement of funds between financial institutions that are members of the first interchange network and the second interchange network utilizes a second set of proprietary communications standards for the exchange of financial transaction data and the settlement of funds between financial institutions that are members of the second interchange network, said computer readable storage media having embodied thereon (i) a first set of computer-executable instructions for execution by at least one first processor associated with a first computing device hosted on the first interchange network and coupled to a first computer-readable storage device, and (ii) a second set of computer-executable instructions for execution by at least one second processor associated with a second computing device hosted on the second interchange network and coupled to a second computer-readable storage device, wherein:

the first set of computer-executable instructions, when executed by the at least one first processor, cause the at least one first processor to receive a first service request from a requestor, wherein the first service request includes request data associated with a corresponding payment transaction over the first interchange network, wherein a payment card used in the corresponding payment transaction has been identified by the requestor as registered for the enrichment services, wherein the first service request has a first set of file characteristics including a first file name, a first file header, and a first file structure each formatted in accordance with the first set of proprietary communications standards and not in accordance with the second set of proprietary communications standards;

the first set of computer-executable instructions, when executed by the at least one first processor, further cause the at least one first processor to transform the first service request to create a second service request that includes the request data, wherein the second service request has a second set of file characteristics including a second file name, a second file header, and a second file structure each formatted in accordance with the second set of proprietary communications standards and not in accordance with the first set of proprietary communications standards;

the second set of computer-executable instructions, when executed by the at least one second processor, cause the at least one second processor to receive the second service request;

the second set of computer-executable instructions, when executed by the at least one second processor, further cause the at least one second processor to generate a first service response that includes response data based on applying at least one of a virtual card mapping service, a transaction rules and limits service, and an alert notifications service to the payment transaction corresponding to the request data, wherein the first service response has a third set of file characteristics formatted in accordance with the second set of proprietary communications standards and not in accordance with the first set of proprietary communications standards;

the first set of computer-executable instructions, when executed by the at least one first processor, further cause the at least one first processor to receive the first service response;

the first set of computer-executable instructions, when executed by the at least one first processor, further cause the at least one first processor to transform the first service response to create a second service response that includes the response data, wherein the second service response has a fourth set of file characteristics formatted in accordance with the first set of proprietary communications standards and not in accordance with the second set of proprietary communications standards; and the first set of computer-executable instructions, when executed by the at least one first processor, further cause the at least one first processor to transmit the second services response to at least one of a cardholder of the payment card and the requestor.

14. The non-transitory computer-readable storage media in accordance with claim 13, wherein the second set of computer-executable instructions, when executed by the at least one second processor, further cause the at least one second processor to provide the first set of computer-executable instructions to the requestor for installation on the first computing device.

15. The non-transitory computer-readable storage media in accordance with claim 13, wherein the second set of computer-executable instructions, when executed by the at least one second processor, further cause the at least one second processor to apply the at least one of the virtual card mapping service, the transaction rules and limits service, and the alert notifications service to the payment transaction by:

retrieving, using the request data, an account identifier associated with the payment card used in the payment transaction;

confirming that the retrieved account identifier is included in a plurality of registered account identifiers stored within a memory device coupled to the enrichment services computer system; and retrieving, from the memory device, the at least one of the virtual card mapping service, the transaction rules and limits service, and the alert notifications service associated with the payment card.

16. The non-transitory computer-readable storage media in accordance with claim 13, wherein the second set of computer-executable instructions, when executed by the at least one second processor, further cause the at least one second processor to generate the first service response by generating an instruction that an issuer bank associated with the requestor decline the payment transaction based upon a result of the applying the at least one of the virtual card mapping service, the transaction rules and limits service, and the alert notifications service to the payment transaction.

17. The non-transitory computer-readable storage media in accordance with claim 13, wherein the second set of computer-executable instructions, when executed by the at least one second processor, further cause the at least one second processor to apply the at least one of the virtual card mapping service, the transaction rules and limits service, and the alert notifications service to the payment transaction by transmitting an alert notification to at least one of a computer device associated with the cardholder and a computer device associated with the requestor, wherein the alert notification causes the at least one of the computer device associated with the cardholder and the computer device associated with the requestor to display the alert notification.

\* \* \* \* \*